(12) United States Patent
Billings et al.

(10) Patent No.: US 7,694,216 B2
(45) Date of Patent: Apr. 6, 2010

(54) AUTOMATIC ASSIGNMENT OF FIELD LABELS

(75) Inventors: Doug Billings, Germantown, MD (US); Aviad Zlotnick, D.N. Galil (IL); Sergey Krutyolkin, Nazeret (IL)

(73) Assignee: International Business Machines Corporation, Armonk, NY (US)

( * ) Notice: Subject to any disclaimer, the term of this patent is extended or adjusted under 35 U.S.C. 154(b) by 2205 days.

(21) Appl. No.: 09/740,733

(22) Filed: Dec. 19, 2000

(65) Prior Publication Data

US 2002/0111961 A1    Aug. 15, 2002

(51) Int. Cl.
*G06F 17/00* (2006.01)
(52) U.S. Cl. .................. 715/221; 715/224; 715/243
(58) Field of Classification Search ............... 715/505, 715/504, 517, 217, 221, 243, 224
See application file for complete search history.

(56) References Cited

U.S. PATENT DOCUMENTS

| | | | |
|---|---|---|---|
| 6,199,079 B1 * | 3/2001 | Gupta et al. | 715/507 |
| 6,243,721 B1 * | 6/2001 | Duane et al. | 715/505 |
| 6,356,897 B1 * | 3/2002 | Gusack | 707/4 |
| 6,499,041 B1 * | 12/2002 | Breslau et al. | 715/505 |
| 6,535,883 B1 * | 3/2003 | Lee et al. | 707/100 |
| 6,651,217 B1 * | 11/2003 | Kennedy et al. | 715/507 |
| 6,662,340 B2 * | 12/2003 | Rawat et al. | 715/507 |
| 6,981,028 B1 * | 12/2005 | Rawat et al. | 709/217 |
| 2002/0010714 A1 * | 1/2002 | Hetherington | 707/505 |

* cited by examiner

*Primary Examiner*—Rachna S Desai

(57) ABSTRACT

A method for processing a document that includes a plurality of fields having respective contents. The method includes providing labels to be assigned respectively to the fields and one or more rules applicable to the contents of the fields according to the labels assigned thereto. A computer reads the contents of the fields, and assigns the labels to the fields responsive to application of the rules to the contents.

27 Claims, 2 Drawing Sheets

AUTOMATIC ASSIGNMENT OF FIELD LABELS

FIELD OF THE INVENTION

The present invention relates generally to document processing, and specifically to methods for extraction of information that is filled into form documents.

BACKGROUND OF THE INVENTION

In many document imaging systems, large numbers of forms are scanned into a computer, which then processes the resultant document images to extract pertinent information. Typically the forms comprise preprinted templates, containing predefined fields that have been filled in by hand or with machine-printed characters. Before extracting the information that has been filled into any given form, the computer must first know which field is which. Only then can the computer process the information that the form contains. The same problem is encountered in form documents and tables that are entered into the computer electronically, when there are differences in format or semantics between different forms or tables.

In some applications, such as population censuses and tax processing systems, a variety of different forms are used. Usually a human operator is employed to identify the locations and contents of the fields on the forms and thus to label the fields for the computer. In some cases, when a large variety of form types is provided without prior sorting by type, it is necessary for the operator to preprocess nearly every document before it can be input to the computer. The involvement of the operator increases the cost of document processing substantially.

SUMMARY OF THE INVENTION

The present invention is based on the realization that even when the geometric distribution of fields on a form is not given in advance, there are often rules that are known to apply to the contents of one or more of the fields. Frequently such rules relate the contents of one field to that of another in some logical manner, typically based on semantic or arithmetic relations between the fields. The known rules can be used by a computer to automatically identify unknown fields in a document or group of documents being processed, based on the contents of the fields that are read by the computer, so as to eliminate or reduce the need for human involvement in field labeling. This realization applies not only to paper documents, but also to electronic documents, generated on a computer, including also tables of entries whose format is not known in advance. Therefore, in the context of the present patent application and in the claims, the term "document" should be interpreted broadly to include any such means for input of structured data to a computer.

Thus, in preferred embodiments of the present invention, a document-processing computer receives a form document (or group of documents) to process. The computer also receives a list of labels identifying fields that are expected to appear on the document and one or more rules that should apply to the contents of the labeled fields. The locations of the fields need not be known in advance. In order to associate the labels with the proper fields, the computer reads out the contents of the fields on the document and tests the field contents against the rules until it has arrived at one or more candidate assignments of the labels to the fields that satisfy the rules. Preferably, geometrical rules, regarding the expected relative locations of fields associated with certain labels, are also used in making the assignments.

The assignment or assignments are used by the computer to extract and process the information in the document. When only a single candidate is found, the computer can proceed to extract and process information from the document by labeling the fields on the basis of the assignment, substantially without operator involvement. Even when multiple candidates are found, the computer is often able to label at least some of the fields in the document autonomously by comparing the different assignments. Operator involvement is needed only to resolve ambiguities remaining after the comparison is completed.

In some preferred embodiments of the present invention, rule-based field labeling is applied to identify unknown fields that appear in a group of documents that have substantially identical geometrical layouts. "Substantially identical" in this context means that the same fields can be found in roughly the same locations in all of the documents in the group, although the labels of these fields are unknown. Preferably, statistical analysis is used to find the candidate assignment or assignments, whereby an assignment is judged to be valid when it satisfies the applicable rules for a specified majority of the documents or of a sample set of the documents, or possibly even for a sizable minority of the documents.

There is therefore provided, in accordance with a preferred embodiment of the present invention, a method for processing a document that includes a plurality of fields having respective contents, the method including:

providing labels to be assigned respectively to the fields and one or more rules applicable to the contents of the fields according to the labels assigned thereto;

reading the contents of the fields; and assigning the labels to the fields responsive to application of the rules to the contents.

Preferably, the rules include a criterion to be applied to the contents of a single one of the fields.

Alternatively or additionally, the rules include a relation between the contents of two or more of the fields. Preferably, the contents include numbers, and the relation includes a mathematical relationship between the numbers contained in the two or more of the fields. Alternatively or additionally, the contents include alphanumeric characters, and the relation includes a semantic relationship between words formed by the characters.

Further alternatively or additionally, the method include providing one or more geometrical rules indicating an expected geometrical relationship between two or more of the fields according to the labels assigned thereto, and assigning the labels to the fields includes applying the geometrical rules along with the rules applicable to the contents of the fields.

Preferably, assigning the labels includes making a test assignment of the labels to the fields, and rejecting the test assignment if the contents of the assigned fields do not satisfy the rules applicable according to the labels. Most preferably, making the test assignment includes iteratively testing substantially all possible assignments of the labels to the fields, so as to find one or more candidate assignments for which the contents of the assigned fields satisfy all of the applicable rules.

Further preferably, assigning the labels to the rules includes finding one or more candidate assignments of all of the labels to the respective fields, for which the contents of the assigned fields satisfy all of the applicable rules, and processing the contents of the fields responsive to the one or more candidate assignments. In a preferred embodiment, finding the one or more candidate assignments includes finding a plurality of alternative candidate assignments for which the contents of the assigned fields satisfy all of the applicable rules, and comparing the candidate assignments so as to unequivocally assign at least a subset of the labels to the respective fields.

In another preferred embodiment, the document includes one of a plurality of form documents sharing a common layout, and assigning the labels includes making an assignment with respect to all of the form documents. Preferably, making the assignment includes choosing the assignment so as to satisfy a statistical criterion with respect to satisfaction of the applicable rules by the contents of the fields in at least a subset of the plurality of form documents.

There is also provided, in accordance with a preferred embodiment of the present invention apparatus for processing a document that includes a plurality of fields having respective contents, the apparatus including a document processor arranged to receive a listing of labels to be assigned respectively to the fields and one or more rules applicable to the contents of the fields according to the labels assigned thereto, and further arranged to read the contents of the fields and to assign the labels to the fields responsive to application of the rules to the contents.

There is additionally provided, in accordance with a preferred embodiment of the present invention, a computer software product for processing a document that includes a plurality of fields having respective contents, the product including a computer-readable medium in which program instructions are stored, which instructions, when read by a computer, cause the computer to receive a listing of labels to be assigned respectively to the fields and one or more rules applicable to the contents of the fields according to the labels assigned thereto, to read the contents of the fields, and to assign the labels to the fields responsive to application of the rules to the contents.

There is further provided, in accordance with a preferred embodiment of the present invention, a method for computerized data processing, including:

receiving information that is input to a plurality of fields in a form on a computer;

providing labels to be assigned respectively to the fields and one or more geometrical rules indicating an expected geometrical relationship between two or more of the fields in the form according to the labels assigned to the fields; and assigning the labels to the fields responsive to the information and to application of the rules to the fields.

In a preferred embodiment, the form includes a table, and receiving the information includes receiving characters keyed into the fields of the table by an operator.

Data processing apparatus and computer software products for carrying out these steps are provided, as well.

The present invention will be more fully understood from the following detailed description of the preferred embodiments thereof, taken together with the drawings in which:

DETAILED DESCRIPTION OF PREFERRED EMBODIMENTS

Figure 1:
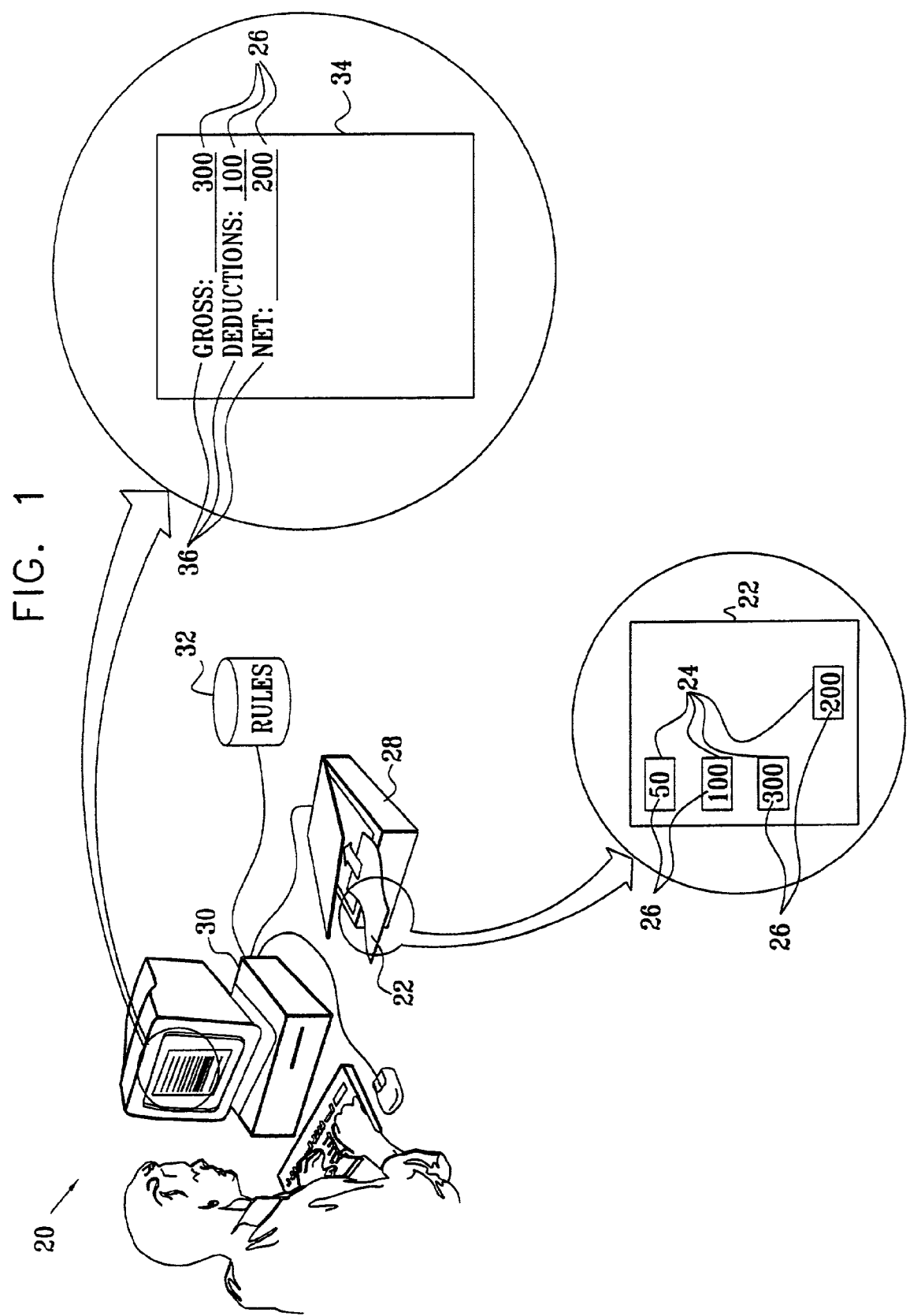
FIG. 1 is a schematic, pictorial illustration of a system for document processing, in accordance with a preferred embodiment of the present invention.

FIG. 1 is a schematic, pictorial illustration of a system 20 for document processing, in accordance with a preferred embodiment of the present invention. System 20 receives a document 22 for extraction of information therefrom. The document preferably comprises a preprinted form having fields 24 that are filled in with handwritten, typed or printed contents 26. The contents typically comprise alphanumeric characters, although they may comprise symbols or marks of other types, generated by hand or by machine. In order to extract information from document 22, system 20 must associate predefined labels with respective fields on the document. The positions of the fields that correspond to the labels, however, are generally not known to system 20 in advance.

A scanner 28 captures an image of document 22 and conveys the corresponding image data to a document processor 30, typically comprising a suitable general-purpose computer. Alternatively, the document is input to the processor from another source, typically in electronic form, either as a document image or as characters keyed in by an operator. The methods described hereinbelow are applicable to form documents of substantially any type, whether created on paper or input electronically to a computer via a keyboard or other input device. Processor 30 uses rules that are stored in a memory 32, such as a magnetic or optical disk, which it uses to label the fields on the document, as described in detail hereinbelow. Preferably, after labeling the fields, the processor extracts contents 26 of fields 24 and arranges the contents appropriately in a database record 34, in which the content of each field is identified by a corresponding label 36.

These field labeling functions of processor 30 (typically together with other document processing functions) are preferably performed using software running on processor 30. The software may be supplied on tangible media, such as diskettes or CD-ROM, and loaded into the processor. Alternatively, the software may be downloaded to the processor via a network connection or other electronic link. Further alternatively, processor 30 may comprises dedicated, hard-wired elements or a digital signal processor designed to carry out some or all of the processing steps.

Figure 2:
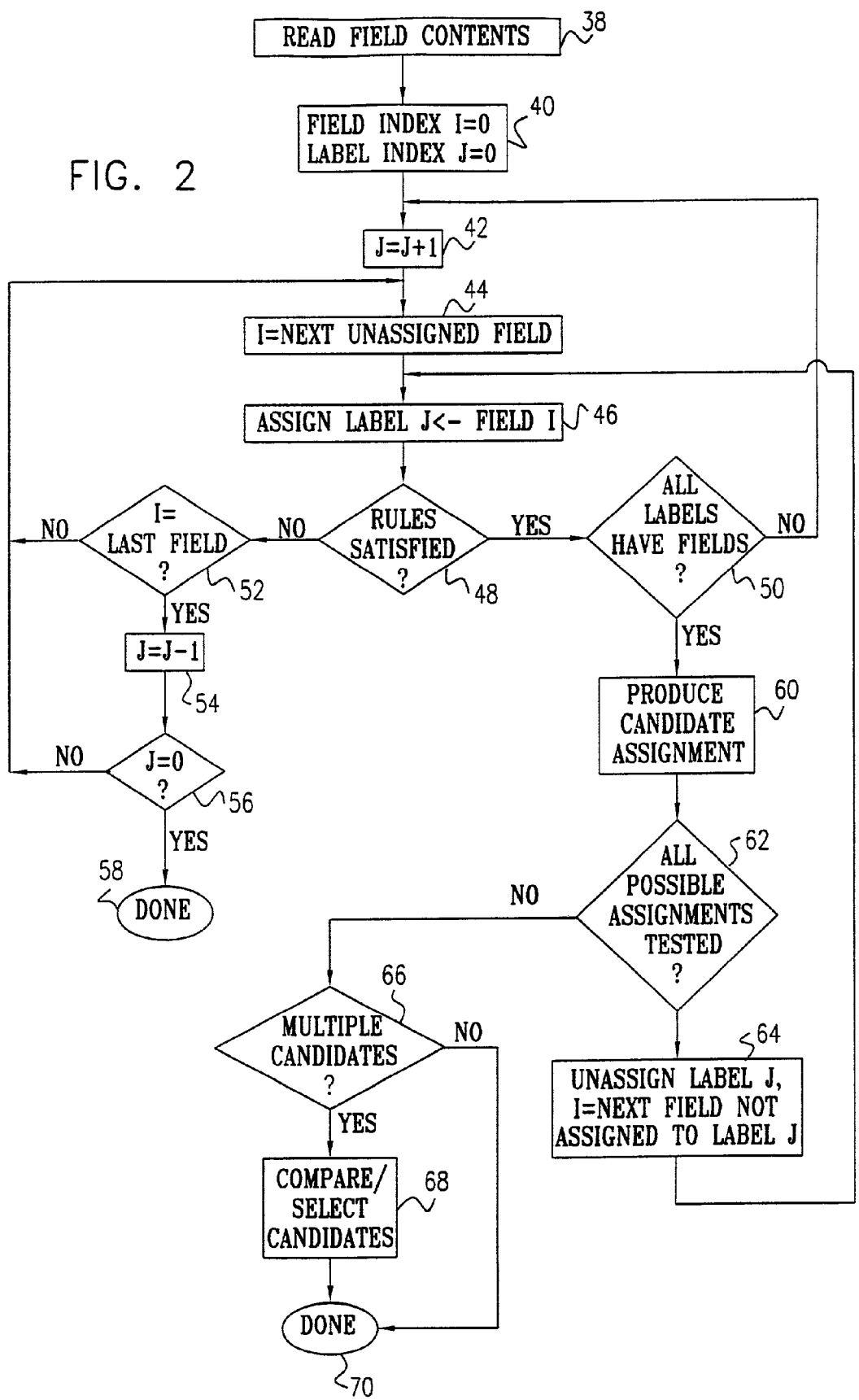
FIG. 2 is a flow chart that schematically illustrates a method for labeling fields in a document, in accordance with a preferred embodiment of the present invention.

FIG. 2 is a flow chart that schematically illustrates a method for labeling fields 24 in document 22, in accordance with a preferred embodiment of the present invention. The method uses a set of rules that are stored in memory 32 and are expected to apply to contents 26 of certain fields 24 in document 22. Preferably, the rules pertain to mathematical or semantic properties of words formed by the characters contained in the field, wherein the term "word" is used broadly to denote any character string, including numbers. Alternatively or additionally, the rules may pertain to geometrical properties of the fields.

Each of the rules may apply to a single field, or it may define a relation between a group of two or more fields. Examples of rules to be applied to a single field include:

Type of characters (letters, numbers).

Number of characters.

Range of values permitted.

Region of the page on which the field is located.

For instance, a simple rule of this sort could specify that for a field to receive a label "ZIP code," it must contain either five or nine numeric characters. Examples of rules to be applied to a group of fields include:

Value of field A greater than that of field B.

Sum of values of fields A and B equal to the value of field C.

Value of field B is found in a look-up table of permitted values for a given value of field A.

Relative locations of fields A and B.

Thus, for instance, in order for field A to be labeled "state," and field B to be labeled "ZIP code," the above-mentioned string of numeric characters in field B must appear in a list of ZIP codes that exist in a state identified by field A. As another illustration, given a known tax withholding rate on net income, field A may be labeled "net income," and field B labeled "tax withheld" only if the value of B is equal to the withholding rate times the value of field A. Other examples of applicable rules will be apparent to those skilled in the art.

Along with these content-based rules, processor 30 preferably applies geometrical rules, as well, regarding relative positions of the fields in the document or table under analysis. An example of such a rule would be that the field to be labeled "ZIP code" must be located to the right of or below the "state" field.

In labeling the fields on document 22, as described below, processor 30 attempts to find an assignment of the labels that does not contradict any of the rules. When the document is one of a group of documents that have substantially identical layouts, the assignment is preferably determined with respect to the entire group. In this case, it may occur that a given assignment satisfies the rules for most of the documents (or most of the documents in a significant statistical sample used for assigning the field labels), but not for all of the documents. For example, the deviant documents may contain errors or null fields that contradict one or more of the rules. In such a case, processor 30 preferably selects the appropriate assignment, notwithstanding the deviant documents, based on predetermined statistical criteria. Thus, although the method of FIG. 2 is described hereinbelow with reference to binary (yes/no) decisions made regarding a single document 22, its extension to soft (probabilistic) decisions of this sort is straightforward.

The method of FIG. 2 begins with a content reading step 38, at which processor 30 reads the contents of the fields on document 22, typically using OCR or other methods known in the art. Alternatively, as noted above, the document may comprise an electronically-entered form or table, in which the contents of the fields are already in computer-readable form. The processor also notes the location of each field for subsequent reference. At this point, however, the assignment of labels to the fields is still unknown. At an initialization step 40, a field index I, indicating the fields to be labeled, and a label index J, indicating the labels that are to be assigned, are initialized to zero. Label 1 is then selected, at a next label step 42, and field 1 is selected, at a next field step 44. The contents of field 1 (typically the value of the number or string read out of the field at step 38) are tentatively assigned to label 1, at an assignment step 46.

At a rule testing step 48, the value of the content of the field that is assigned to the current label is tested against the rules that are applicable to the label. In the first iteration (I=J=1), of course, the set of rules is limited to single field rules regarding label 1. In subsequent iterations through steps 42-46, as additional labels are assigned to respective fields, more rules come into play. Preferably, at each iteration of step 48, processor 30 tests only the rules that apply to the most recently-assigned label. Further preferably, the rules are checked in order of increasing processing cost, so that "expensive" rules, requiring more substantial processing power, are checked only it is confirmed that the current assignment satisfies applicable "cheap" rules.

After processor 30 ascertains at step 48 that the rules are satisfied for the most recently-assigned label, it checks to determine whether all of the labels applicable to document 22 have now been assigned, at a completion checking step 50. If there are more fields found on the documents than labels to be assigned, some of the fields may remain unassigned. If not all of the labels have been assigned, the processor goes on to assign the next unassigned field (I) to the next label (J) on the list, at steps 42 through 46, until all of the labels are assigned, subject to satisfying the applicable rules at step 48.

If the processor finds at step 48 that one or more of the rules are not satisfied by the most recent field-label assigned, it must try assigning other fields to the current label so as to find an assignment that does satisfy the rules. For this purpose, the processor goes through the remaining unassigned fields in order, until the last unassigned field is reached at a last field step 52. For each of the unassigned fields in turn, the processor assigns the new field value to the current label, at steps 44 and 46, and then tests again to determine whether the rules are satisfied at step 48.

If the processor reaches the last unassigned field at step 52 without having passed step 48 successfully, it means that there is no available field assignment for the current label, given the fields already assigned to the preceding labels on the list, that will satisfy the rules. In this case, the label index J is decremented, at a previous label step 54, causing the field that is currently assigned to the previous (J−1) label on the list to be unassigned from the label. The next unassigned field is then assigned to this previous label (which is now treated as the current label) at steps 44 and 46, and the new assignment is tested at step 48. This procedure continues iteratively until all of the labels are successfully assigned, or until J has been decremented back to zero, at a final decrement step 56. If this stage is reached, it means that all possible assignments of the first label on the list have been tested, and none has been found to satisfy the rules. In this event, processor 30 returns an error message, at a failure step 58.

On the other hand, when it is determined at step 50 that all of the labels have received field assignments that satisfy the rules, the current set of assignments is recorded as a valid candidate assignment, at a candidate production step 60. There may be more than one possible assignment of fields to labels, however, that is capable of satisfying the rules. For example, a rule that specifies that the sum of the values of fields A and B is equal to the value of field C is commutative between fields A and B. Therefore, in the absence of another rule restricting these values (such as A>B), at least two candidate assignments will be valid. For this reason, after recording a candidate assignment, the processor checks to determine whether it has tested all possible assignments of fields to labels, at an assignment checking step 62.

If there are untested assignments remaining, the processor begins to evaluate these untested assignments by unassigning the last-assigned label (label J) from its respective field, at an unassignment step 64. Instead, label J receives the next available unassigned field that has not yet been assigned to this label, at step 46, and the new assignment is tested at step 48. The method then proceeds as described above, until all of the possible assignments have been tested.

When this exhaustive testing is found to have been completed at step 62, there may be more than one candidate assignment that was discovered. At a multiple candidate step 66, the number of candidates is evaluated. If only a single candidate was found, it becomes the assignment to be used by processor 30 in extracting information from document 22, at a completion step 70. If multiple candidates are found, however, it is necessary to process the candidates further in order to find the correct assignment, at a candidate comparison step 68. Preferably, the processor examines the candidates for overlap with respect to assignment of certain fields to respective labels. The specific field-label assignments that are found to be common to all of the candidates are then confirmed as being correct, even if there are other specific assignments on which the candidates differ. When multiple documents with substantially identical layouts are processed, as described above, statistical analysis can also be used to choose the correct assignments at this stage. For this purpose, for example, each field-label assignment may be assigned a weight, and any candidate having a cumulative weight that is significantly greater than the weights of the other candidates is preferably chosen as the correct one. Any ambiguities remaining after the processor has completed its analysis are preferably passed to a human operator for resolution.

Table I below presents a simplified example of the implementation of the method of FIG. 2. The method is applied here in order to assign labels A, B and C to four fields having values 100, 300, 50 and 200, subject to the rule that A+B=C. Each row in the table represents the result of a successive iteration of the method through step 48.

TABLE I

1. A: 100
2. A: 100, B: 300
3. Unable to assign a field to C
4. A: 100, B: 50
5. Unable to assign a field to C
6. A: 100, B: 200
7. A: 100, B: 200, C: 300; produce candidate assignment
8. Unable to assign another field to C
9. Unable to assign another field to B
10. A: 300
11. A: 300, B: 100
12. Unable to assign a field to C
13. A: 300, B: 50
14. Unable to assign a field to C
15. A: 300, B: 200
16. Unable to assign a field to C
17. Unable to assign another field to B
18. A: 50
19. A: 50, B: 100
20. Unable to assign a field to C
21. A: 50, B: 300
22. Unable to assign a field to C
23. A: 50, B: 200
24. Unable to assign a field to C
25. Unable to assign another field to B
26. A: 200
27. A: 200, B: 100
28. A: 200, B: 100, C: 300; produce candidate assignment
29. Unable to assign another field to C
30. A: 200, B: 300
31. Unable to assign a field to C
32. A: 200, B: 50
33. Unable to assign a field to C
34. Return two candidates; done.

Although preferred embodiments are described hereinabove with reference to processing of form documents, and particularly preprinted paper documents, the principles of the present invention may also be applied to processing of documents, tables and images of other types that contain certain predetermined fields in locations that are not necessarily known in advance. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing a document that includes a plurality of fields having respective contents that have been filled into the fields, the method comprising:

providing labels to be assigned respectively to the fields, one or more rules applicable to the filled-in contents of the fields according to the labels assigned thereto, and one or more geometrical rules indicating an expected geometrical relationship between two or more of the fields according to the labels assigned thereto:

machine reading the respective contents that have been filled into the fields;

machine assigning the labels to the fields by testing the contents of the fields against the rules in order to find an assignment of the labels to the fields that satisfies the rules, the assigning further applying the geometrical rules along with the rules applicable to the contents of the fields; and extracting and arranging the contents in a database record, in which the contents of the fields are identified by the assigned labels.

2. A method according to claim 1, wherein the rules comprise a criterion to be applied to the contents of a single one of the fields.

3. A method according to claim 1, wherein the rules comprise a relation between the contents of two or more of the fields.

4. A method according to claim 3, wherein the contents comprise numbers, and wherein the relation comprises a mathematical relationship between the numbers contained in the two or more of the fields.

5. A method according to claim 3, wherein the contents comprise alphanumeric characters, and wherein the relation comprises a semantic relationship between words formed by the characters.

6. A method according to claim 1, wherein assigning the labels comprises making a test assignment of the labels to the fields, and rejecting the test assignment if the contents of the assigned fields do not satisfy the rules applicable according to the labels.

7. A method according to claim 6, wherein making the test assignment comprises iteratively testing substantially all possible assignments of the labels to the fields, so as to find one or more candidate assignments for which the contents of the assigned fields satisfy all of the applicable rules.

8. A method according to claim 1, wherein assigning the labels to the rules comprises finding one or more candidate assignments of all of the labels to the respective fields, for which the contents of the assigned fields satisfy all of the applicable rules, and processing the contents of the fields responsive to the one or more candidate assignments.

9. A method according to claim 8, wherein finding the one or more candidate assignments comprises finding a plurality of alternative candidate assignments for which the contents of the assigned fields satisfy all of the applicable rules, and comparing the candidate assignments so as to unequivocally assign at least a subset of the labels to the respective fields.

10. A method according to claim 1, wherein the document comprises one of a plurality of form documents sharing a common layout, and wherein assigning the labels comprises making an assignment with respect to all of the form documents.

11. A method according to claim 10, wherein making the assignment comprises choosing the assignment so as to satisfy a statistical criterion with respect to satisfaction of the applicable rules by the contents of the fields in at least a subset of the plurality of form documents.

12. A method according to claim 1, wherein the document is a paper document with a template preprinted thereon defining the fields, and wherein reading the respective contents comprises capturing an image of the document after the contents have been marked inside the fields defined by the template, and processing the image to extract the contents.

13. An apparatus for processing a document that includes a plurality of fields having respective contents that have been filled into the fields, the apparatus comprising:

a document processor arranged to receive a listing of labels to be assigned respectively to the fields, and one or more rules applicable to the filled-in contents of the fields according to the labels assigned thereto, and one or more geometrical rules indicating an expected geometrical relationship between two or more of the fields according to the labels assigned thereto:

the document processor further arranged to machine read the respective contents that have been filled into the fields;

the document processor to machine assign the labels to the fields by testing the contents of the fields against the rules in order to find an assignment of the labels to the fields that satisfies the rules;

the document processor arranged to apply the geometrical rules along with the rules applicable to the contents of the fields so as to assign the labels to the fields; and the document processor to extract and arrange the contents in a database record, in which the contents of the field are identified by the assigned labels.

14. Apparatus according to claim 13, wherein the rules comprise a criterion to be applied to the contents of a single one of the fields.

15. Apparatus according to claim 13, wherein the rules comprise a relation between the contents of two or more of the fields.

16. Apparatus according to claim 15, wherein the contents comprise numbers, and wherein the relation comprises a mathematical relationship between the numbers contained in the two or more of the fields.

17. Apparatus according to claim 15, wherein the contents comprise alphanumeric characters, and wherein the relation comprises a semantic relationship between words formed by the characters.

18. Apparatus according to claim 13, wherein the processor is arranged to make a test assignment of the labels to the fields, and to reject the test assignment if the contents of the assigned fields do not satisfy the rules applicable according to the labels.

19. Apparatus according to claim 18, wherein the processor is arranged to iteratively test substantially all possible assignments of the labels to the fields, so as to find one or more candidate assignments for which the contents of the assigned fields satisfy all of the applicable rules.

20. Apparatus according to claim 13, wherein the processor is arranged to find one or more candidate assignments of all of the labels to the respective fields, for which the contents of the assigned fields satisfy all of the applicable rules, and to process the contents of the fields responsive to the one or more candidate assignments.

21. Apparatus according to claim 20, wherein the one or more candidate assignments comprise a plurality of alternative candidate assignments for which the contents of the assigned fields satisfy all of the applicable rules, and wherein the processor is arranged to compare the candidate assignments so as to unequivocally assign at least a subset of the labels to the respective fields.

22. Apparatus according to claim 13, wherein the document comprises one of a plurality of form documents sharing a common layout, and wherein the processor is arranged to make an assignment of the labels with respect to all of the form documents.

23. Apparatus according to claim 22, wherein the processor is arranged to make the assignment so as to satisfy a statistical criterion with respect to satisfaction of the applicable rules by the contents of the fields in at least a subset of the plurality of form documents.

24. A method for computerized data processing, comprising:

receiving information that has been filled into a plurality of fields in a form on a computer;

providing labels to be assigned respectively to the fields and one or more geometrical rules indicating an expected geometrical relationship between two or more of the filled-in fields in the form according to the labels assigned to the fields;

assigning the labels to the fields by testing the information in the fields against the rules in order to find an assignment of the labels to the fields that satisfies the rules; and extracting and arranging the information in a database record, in which the information that has been filled into the fields is identified by the assigned labels.

25. A method according to claim 24, wherein the form comprises a table, and wherein receiving the information comprises receiving characters keyed into the fields of the table by an operator.

26. An apparatus for data processing comprising:

a form processor arranged to receive information that has been filled into a plurality of fields in a form on a computer, a listing of labels to be assigned respectively to the fields, and one or more geometrical rules indicating an expected geometrical relationship between two or more of the filled-in fields in the form according to the labels assigned to the fields;

the form processor to assign the labels to the fields by testing the information in the fields against the rules in order to find an assignment of the labels to the fields that satisfies the rules; and the form processor to extract and arrange the information in a database record, in which the information that has been filled into the fields is identified by the assigned labels.

27. A computer software product comprising a computer readable tangible medium in which program instructions are stored, which instructions, when read by a computer, cause the computer to:

receive information that has been filled into a plurality of fields in a computerized form, a listing of labels to be assigned respectively to the fields, and one or more geometrical rules indicating an expected geometrical relationship between two or more of the filled-in fields in the form according to the labels assigned to the fields;

assign the labels to the fields by testing the information in the fields against the rules in order to find an assignment of the labels to the fields that satisfies the rules; and extract and arrange the information in a database record, in which the information that has been filled into the fields is identified by the assigned labels.

* * * * *